No. 769,774. Patented September 13, 1904.

UNITED STATES PATENT OFFICE.

HERMANN H. SPOHN, OF BOSTON, MASSACHUSETTS, ASSIGNOR TO CARTER'S INK COMPANY, OF BOSTON, MASSACHUSETTS, A CORPORATION OF MASSACHUSETTS.

INK.

SPECIFICATION forming part of Letters Patent No. 769,774, dated September 13, 1904.

Application filed April 28, 1904. Serial No. 205,409. (No specimens.)

*To all whom it may concern:*

Be it known that I, HERMANN H. SPOHN, a subject of William, Emperor of Germany, residing at Boston, in the county of Suffolk and State of Massachusetts, have invented a new and useful Improvement in Inks, of which the following is a full, clear, and exact description.

My invention relates to an improvement in inks especially adapted for laundry-work, stenciling, stamp-canceling, and similar purposes. Such inks require to be permanent in character and to have the ability to permeate the fiber of the material and at the same time show a strong color. They should dry quickly, leaving a dark marking which is practically indelible, so that it may not be removed by any of the ordinary chemical solvents. I have heretofore described such an ink in Letters Patent No. 741,734, granted on my application October 20, 1903. In the ink there described nigrosine was used as a base combined with other substances. Nigrosine, however, is an oil-soluble color, and not only it, but other oil-soluble colors, while they may be procured in the market, are made by comparatively few manufacturers and are comparatively expensive. My endeavor has been to find an ink which is more easily manufactured and the materials for which may be easily and generally secured in the market. Such an ink I believe I have now discovered, which is equally efficient with an ink having an oil-soluble base, such as that described in my previous patent above referred to, the peculiarity of my present ink being that instead of being made from an oil-soluble color it is made from a water-soluble color and yet being treated in the manner described is fully as efficient and indelible as the ink made from an oil-soluble color. These water-soluble anilin colors are not soluble in oil, and yet, so far as known, oil is one of the essentials to an ink of this class. I have found, however, that when a water-soluble color has been combined with caustic potash and oleic acid, whether the caustic potash and the oleic acid have been previously combined to form an acid soap or not, the resultant may be mixed with oil and the whole then used either with or without the addition of any of the known canceling-inks and form an indelible ink of the character required.

My invention therefore relates to an ink having a water-soluble anilin-color base, and in order to make my ink in the preferred manner I heat one pound five and three-fourth ounces of acid soap to a temperature of about 150° Fahrenheit. When this temperature has been reached, I add eleven and one-fourth ounces of a water-soluble color, of which indanil blue is a sample. After the two have been thoroughly mixed and the color dissolved, during which a chemical reaction takes place, the new compound is cooled to about 120° Fahrenheit, at which point there is added to it about eighty-seven pounds three and three-fourth ounces of some kind of non-drying oil—for example, rosin-oil. These proportions, which, it will be noted, make about ninety-one pounds of indelible composition, are not intended to be controlling, although I have found them very satisfactory for my purpose. Both they and the temperatures referred to are approximate. To the solution thus made may be added, by grinding, a quantity of canceling-ink of the kind in ordinary use or of lampblack, by means of which a more solid color is given to the ink, so that it will be more permanent in character. For this purpose I prefer to use a mixture of equal parts of lampblack and carbon-black—say two pounds five and one-half ounces of each—which are ground into the solution until they are thoroughly mixed, after which I mix in five pounds of kerosene-oil, which makes the ink more penetrating.

I do not mean to limit myself to the especial water-soluble basic anilin color above referred to, as the base for my ink may be any other water-soluble basic color. Moreover, caustic soda may be substituted for caustic potash and stearic acid may be substituted for oleic acid.

As the result of my invention I believe that an indelible ink is secured which has all the advantages of the indelible canceling-ink now most generally used, and yet may be made at less cost.

What I claim as my invention is—

1. The composition of matter above described which contains a water-soluble, basic, anilin color, an acid soap or its constituents, and a non-drying oil in substantially the proportions named.

2. A canceling-ink having added thereto a new composition of matter containing a water-soluble color base, an acid soap, and a non-drying oil as set forth.

3. An indelible canceling-ink containing an acid soap, a water-soluble, basic color, a non-drying oil, and equal portions of lampblack and carbon-black in substantially the proportions named.

4. An indelible canceling-ink containing an acid soap, a water-soluble, basic color, a non-drying oil, equal portions of lampblack and carbon-black, with the addition of kerosene, all in substantially the proportions named.

5. The process of making an indelible ink of the character specified which consists in heating acid soap or its constitutents together to the temperature of about 150° Fahrenheit, adding thereto a water-soluble, basic, anilin color, and thereafter allowing the resultant to cool to a temperature of about 120° Fahrenheit and adding thereto a non-drying oil as and for the purposes set forth.

HERMANN H. SPOHN.

Witnesses:
GEORGE O. C. COALE,
M. V. FOLEY.